ELECTRICAL CIRCUIT HAVING TWO OR MORE STABLE STATES

Filed April 29, 1955 2 Sheets-Sheet 1

INVENTOR
WILLIAM J. BARTIK
BY Charles C. English
AGENT

ELECTRICAL CIRCUIT HAVING TWO OR MORE STABLE STATES

Filed April 29, 1955 2 Sheets-Sheet 2

INVENTOR
WILLIAM J. BARTIK
BY Charles C. English
AGENT

United States Patent Office 2,854,656

Patented Sept. 30, 1958

2,854,656

ELECTRICAL CIRCUIT HAVING TWO OR MORE STABLE STATES

William J. Bartik, Hatboro, Pa., assignor, by mesne assignments, to Sperry Rand Corporation, New York, N. Y., a corporation of Delaware Application April 29, 1955, Serial No. 504,974

28 Claims. (Cl. 340—174)

This invention relates to circuits having at least two stable states and more particularly to circuits of that type employing magnetic amplifiers. The invention in its preferred form employs two magnetic cores.

A number of circuits having two stable states have been suggested in the prior art, some of which employ the principles of magnetic amplifiers. However, these prior circuits have a disadvantage in that their output pulses are not in a form readily available for use in certain types of computing circuits.

It is one object of this invention to provide a circuit with at least two stable states which has a peculiar type of output of special value in certain computer circuits.

Another object of the invention is to provide a circuit with at least two stable states which is reliable in operation.

An additional object of the invention is to provide a circuit having at least two stable states and which has a small number of operating parts.

It is an additional object of the invention to provide a circuit with at least two stable states which is lower in cost than other such circuits.

Yet another object of the invention is to provide a circuit with at least two stable states which is of very small physical size.

Another object of the invention is to provide an improved magnetic register.

Still another object of the invention is to provide a device for storing information.

An additional object of the invention is to provide a magnetic device having at least two stable states, which can be placed in a first stable state by energizing a first input, which will remain in the first stable state until the second input is energized at which time it will be shifted to a second stable state where it will remain until the first input is again energized. Read-out signals showing which stable state the device is in recur regularly and read-out signals do not destroy the stored information.

An additional object of the invention is to provide a magnetic storage device in which read-out does not destroy the stored information.

Still another object is to provide a magnetic amplifier circuit with more than two stable states.

A further object of the invention is to provide a magnetic amplifier, having at least two stable states, and whose output has power gain with respect to the input.

Other objects of the invention will appear as this description proceeds.

In one form, the invention employs two magnetic cores both of which have windings energized by a source of pulses. These windings are branches of parallel current paths whereby when one of the windings has high impedance, and the other lower impedance, substantially all of the current flows through the low impedance winding. In one stable state of the apparatus, the first of the windings always has low impedance to positive pulses and high impedance to negative pulses and the second winding has high impedance to positive pulses and low impedance to negative pulses. Additional windings on the cores may be used to shift the device to a second stable state by flipping the two cores to different regions on their hysteresis loops whereby the first winding has low impedance to negative pulses and high impedance to positive pulses, while the second winding has high impedance to negative pulses and low impedance to positive pulses. The currents flowing through the respective windings appear in first and second outputs. Further details of the circuit will appear as the description proceeds.

Figure 1:
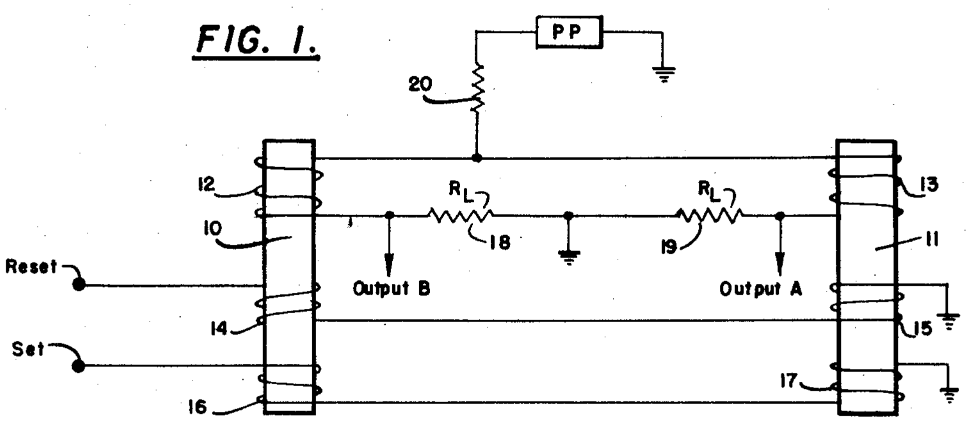
Figure 1 is a schematic diagram of one form of the invention.
Figure 2:
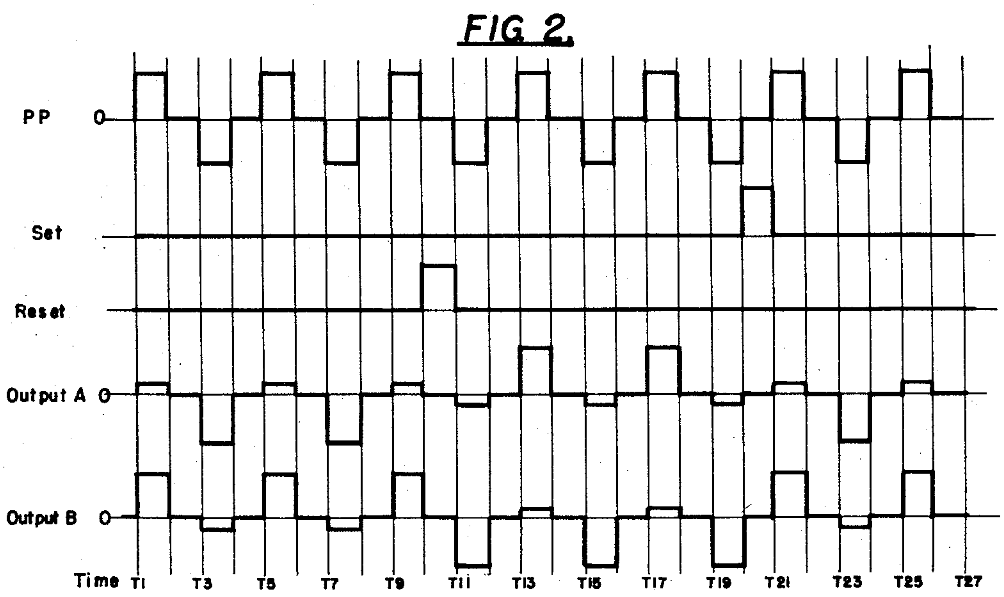
Figure 2 is a timing diagram for the device of Figure 1.
Figure 3:
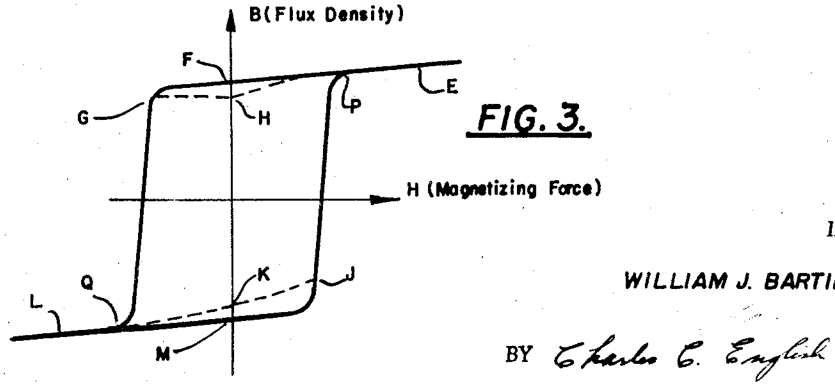
Figure 3 is an idealized hysteresis loop for the cores of Figure 1.

In the device of Figure 1, there is a source of alternating current PP which in the present case produces positive and negative power pulses having a waveform as shown in Figure 2. It is not necessary, however, that this source produce square wave pulses inasmuch as it could, for example, produce sine waves instead. The cores 10 and 11 may be made of a variety of materials, among which are the various types of ferrites and the various magnetic tapes, including Orthonik and 4–79 Moly-Permalloy. These materials may have different heat treatments to give them different properties. The magnetic material employed in the cores should preferably, though not necessarily, have a substantially rectangular hysteresis loop (as shown in Figure 3). Cores of this character are now well known in the art. In addition to the wide variety of materials available, the cores may be constructed in a number of geometries including both closed and open paths; for example, cup-shaped, strips, and toroidal-shaped cores are possible. Those skilled in the art understand that when a core is operating on the horizontal (or substantially saturated) portions of its hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

Cores 10 and 11 have power windings 12 and 13 respectively, "Reset" windings 14 and 15 respectively, and "Set" windings 16 and 17 respectively. There are two load resistors $R_L$ which are in series with coils 12 and 13 and bear reference numbers 18 and 19 respectively. There are two separate outputs A and B. Resistor 20 is in series with the source of pulses PP and has a high value of resistance as compared with the windings 12 and 13 and load resistors 18 and 19 so that in effect the source is a constant current source. Load resistor 18 has small resistance compared to the impedance of coil 12 when core 10 is unsaturated and preferably, but not necessarily, large resistance compared to the impedance of coil 12 when core 10 is saturated. The same relationship holds between load resistor 19 and coil 13.

If it be assumed at the start of the apparatus that the core 10 is at point F of the hysteresis loop of Figure 3 and the core 11 at point M, the power pulse which goes positive at time instant T1 (see Figure 2) will drive the core 10 from point F to point E and will drive the core 11 from point M to point J. Since the core 10 will be operating on a substantially saturated portion of the hysteresis loop, the coil 12 will have low impedance and the voltage at output B at time period T1—T2 will be a large positive pulse; whereas the voltage at output A at time period T1—T2 will be only a small pulse since the core 11 will be moving away from saturation and coil 13 will have high impedance. Hence, it may be assumed that near the end of the first power pulse the core 10 will be at point E and the core 11 will be at point J of the hysteresis loop of Figure 3. Following time instant T2, the core 10 will return to remanence point F and the core 11 will return to remanence point K. The cores will remain at these remanence points during time period T2—T3 when there is no current flowing from the source PP. At time instant T3, the current from source PP flowing through coil 12 will start driving core 10 negatively from point F toward point G on the hysteresis loop. Since this is driving the core away from saturation, coil 12 will have high impedance and the current flowing through resistor 18 and output B will be small (during time period T3—T4). The pulse from source PP which goes negative at time instant T3 will drive core 11 from point K to point L on the hysteresis loop and since the latter point is substantially at negative saturation, the coil 13 will have low impedance and the current flowing through resistor 19 will be large. Hence, there will be a large negative current flowing through resistor 19 and a large output A at time period T3—T4. At time instant T4 the current from source PP returns to zero and the core 10 moves from point G to remanence point H while the core 11 moves from saturation point L to remanence point M. The apparatus is then ready to repeat the aforesaid cycle and will continue to repeat it until a pulse is received at the "Reset" input. In other words, prior to time instant T10 there will be small positive pulses and large negative pulses at output A, and large positive pulses and small negative pulses at output B. A "Reset" input pulse at time period T10—T11 will flow through coils 14 and 15 and will be so large so to flip both cores 10 and 11 to the opposite end of its hysteresis loop. In other words, that "Reset" pulse will flip core 10 from point F to substantially point Q and at the termination of the reset pulse, core 10 will return to remanence point M. Likewise the reset pulse will flip core 11 from point K to point P and at the conclusion of the reset pulse the core will return to remanence point F. Hence, the next negative pulse from source PP will drive the core 10 from point M to negative saturation at point L, while it will drive core 11 from point F to point G. Coil 12 will have low impedance to this negative pulse and coil 13 high impedance thereto. In other words, there will be a large negative voltage at output B and a small negative voltage at output A. This is clearly shown at time period T11—T12 of Figure 2. At time instant T12, core 10 will return to remanence point M and core 11 will return to remanence point H. The pulse which goes positive at time instant T13 will drive core 11 to saturation at E giving low impedance to coil 13 and a large positive voltage pulse at output A. At the same time the positive power pulse will drive the core 10 from point M to point J, away from saturation, thus giving a small voltage during time period T13—T14 at output B. At time instant T14 both cores 10 and 11 return to their respective remanence points K and F. The next negative power pulse at time period T15—T16 will drive core 10 to saturation at L and core 11 toward G away from saturation giving a large negative pulse at output B and a small negative pulse at output A, as shown at time period T15—T16. At time period T17—T18 the operations will be the same as at time period T13—T14. Likewise at time period T19—T20 the operations will be the same as at time period T15—T16. This cycle of operations will continue until a "Set" input pulse is received. For purposes of illustration, Figure 2 shows such as set input pulse arriving at time period T20—T21. It flows through windings 16 and 17 and flips core 10 from point M to point P and at the end of the set input pulse the core returns to remanence point F. Likewise the set input pulse flowing through winding 17 flips core 11 from point H to point Q and at the conclusion of the pulse it returns to remanence point M. Hence, the apparatus is now in its original stable state and will repeat the same cycle of operations as occurred prior to time instant T10.

It is further noted that while the drawing shows only two cores 10 and 11 that there could be additional cores whereby the current from source PP would divide through coils on three or more cores in proportion to the impedances of those cores.

One novel feature of this invention is that once the cores have been moved to a given stable state, the device will remain in that stable state until one or more of the inputs is energized to transfer it to another stable state. Information is read out of the device without altering the stable state of the device. This distinguishes it from other devices of this same general category since in them, reading out of information normally changes the state in which the apparatus is operating.

It is noted that the device may act as a memory since information may be stored in it by energizing the set or reset input whereby the device will retain the information stored in it and give outputs according to the stored information, until new information is stored therein.

Figure 4:
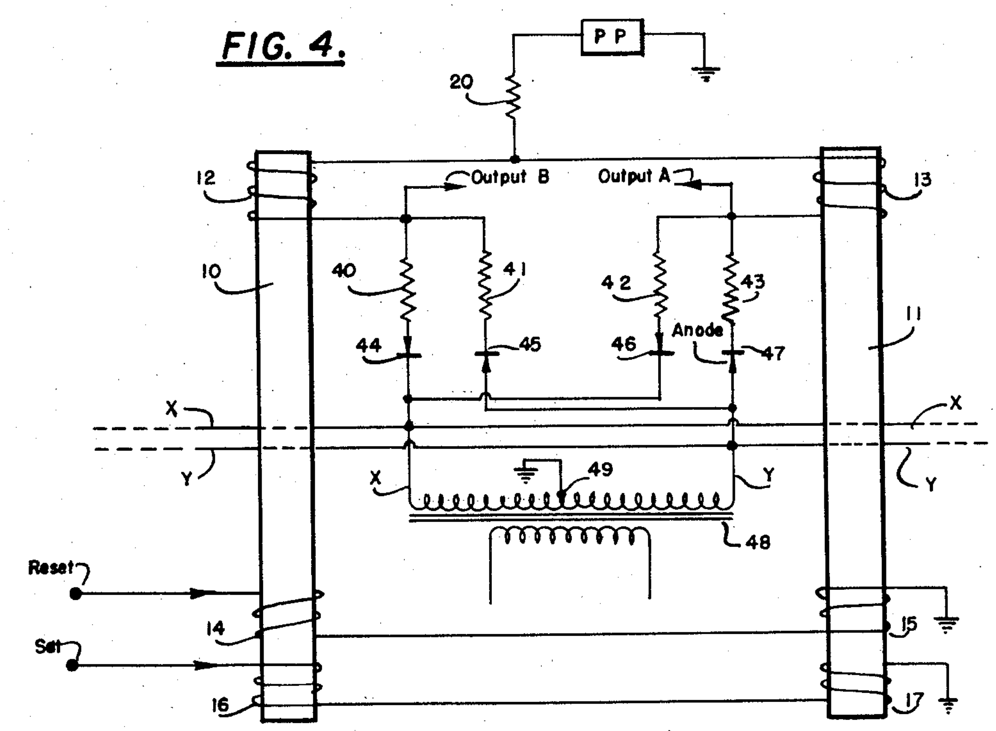
Figure 4 is a schematic diagram of a modified form of the invention.
Figure 5:
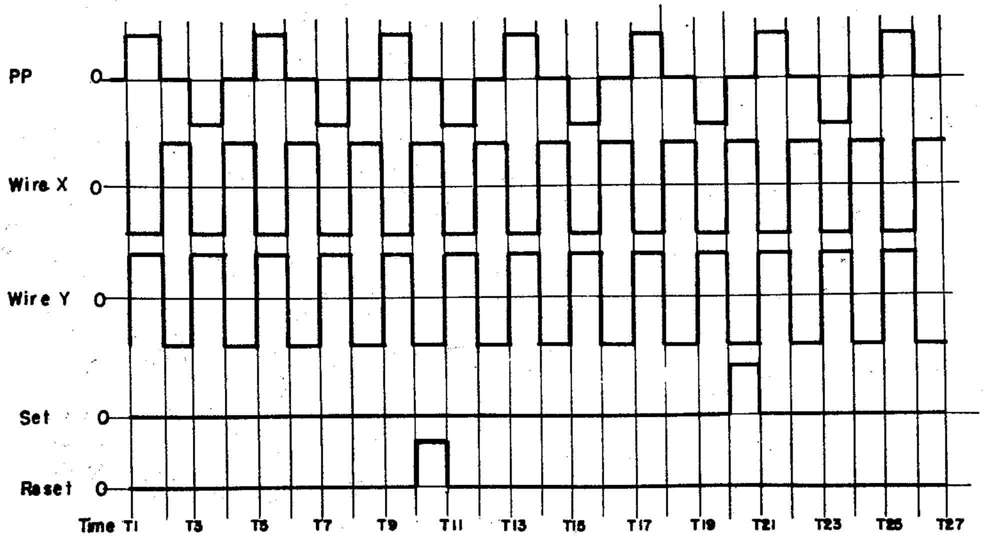
Figure 5 is a timing diagram of the device of Figure 4.

Figure 4 is a flip-flop circuit similar to that of Figure 1 except for the output circuit. Similar reference numbers on Figures 1 and 4 represent similar parts. Output or load resistors 40, 41, 42 and 43 are respectively in series with rectifiers 44, 45, 46 and 47. Rectifiers 44 and 46 have their cathodes connected to wire X and rectifiers 45 and 47 have their anodes connected to wire Y. Transformer 48 produces a square wave alternating current and therefore the potentials on wire X and wire Y with respect to the grounded center tap 49 is as shown in Figure 5. The purpose of rectifiers 44 to 47 inclusive and transformer 48 is to prevent currents in windings 14 to 17 inclusive from inducing currents in coils 12 and 13 which might flow in the load circuit. It is noted in Figure 5 that the set and reset pulses always occur during the time interval when the potential of source PP is zero. In other words, between the positive pulse excursions of source PP there is a period when the potential is at zero. It is during these periods of zero potential that set and reset pulses appear. During the aforesaid periods of zero potential, the transformer 48 produces positive pulses on wire X which render the cathodes of rectifiers 44 and 46 positive and thereby cuts off these rectifiers and prevents any current from flowing through resistors 40 and 42. During the aforesaid periods when source PP has zero potential, the transformer 48 causes wire Y to go negative and hence the anodes of rectifiers 45 and 47 are negative during these intervals and these rectifiers are therefore cut off. Hence no current can flow during these intervals through load resistors 41 and 43. Consequently, in Figure 4 current can flow through load resistors 40 to 43 inclusive only during the positive and/or negative excursions of the source PP.

When a number of devices of the character shown in Figure 4 are employed, a single center tapped transformer 48 may supply the necessary blocking potentials for all of them. In other words, wires X and Y may be power lines which extend to a large number of similar devices. A large array of these devices could form a large memory for the storage of information. So far as each memory per se is concerned, the transformer 48 is not, therefore, a part of the circuit and any suitable center tapped source of alternating current may replace the transformer 48.

In view of the addition of rectifiers 44 to 47 inclusive, the apparatus of Figure 4 has gain. In other words, the signals at outputs A and B may have greater power than need be applied to the set and reset inputs in order to establish the information storage conditions. This is true in addition to the fact that information may be read out of outputs A and B without destroying the information stored in the cores 10 and 11.

Except as stated above, the device of Figure 4 operates in the same way as the device of Figure 1, and has output signals of the same characteristics as those of Figure 1.

If it be assumed that at the start of the apparatus, core 10 is at point F on the hysteresis loop of Figure 3 and core 11 at point M, the first positive pulse from source PP will flow through coil 12, resistor 40, rectifier 44, the lefthand side of the secondary winding of transformer 48, through the center tap 49 of the transformer to ground. This will drive the core 10 to saturation at E. The current flowing from source PP through winding 13 will meet with high impedance in that winding and hence only a small current will flow through load resistor 42 and rectifier 46 and thence through wire X to the center tap 49 to ground. While the circuit is still in this first stable state, when the source PP goes negative, the core 10 is driven from point F to point G on the hysteresis loop of Figure 3, coil 12 has high impedance, and only a small current flows from PP through coil 12, resistor 41, rectifier 45, wire Y, thence to the center tap 49 and to ground. This same negative pulse will drive core 11 from point K to saturation at L and winding 13 will have low impedance, therefore a large pulse will flow from source PP through winding 13, load resistor 43, rectifier 47, wire Y, center tap 49 to ground.

An appropriate pulse to the set or reset input, as required, will flip the device to its second stable state in which core 10 is initially at point M on the hysteresis loop and core 11 is initially at point F on its hysteresis loop. In this stable state, the first positive pulse from source PP will drive core 11 from point F to point E, winding 13 will have low impedance and a large current will flow through winding 13, load resistor 42, rectifier 46, wire X, center tap 49, to ground. The current flowing through winding 12 will tend to drive core 10 from point M to point J, therefore this winding will have high impedance and the current flowing through resistor 40 will be small. The negative pulses of source PP during this second stable state will drive core 13 from point F to point G on the hysteresis loop of Figure 3 and will drive core 10 from point K to saturation at L so that there will be only a small negative current in load resistor 43 while there will be a large negative current in load resistor 41.

While I have shown one form of the invention as well as one modified form thereof, it is understood that other modifications within the scope of the appended claims may be made without departing from the broadest aspects of the invention.

I claim to have invented:

1. An electrical circuit comprising first and second saturable cores; first and second windings on said cores respectively; first and second outputs; a first branch circuit including said first winding and said first output; a second branch circuit including said second winding and said second output; control means for placing the electrical circuit in a first stable state in which the first core operates in a region near positive remanence and the second core operates in a region near negative remanence and alternatively for placing the circuit in a second stable state in which the first core operates in a region near negative remanence and the second core operates in a region near positive remanence; and means including a source of alternating current for energizing said branch circuits and producing pulses of one polarity which in the first stable state drive the first core from plus remanence to plus saturation and the second core from minus remanence up the hysteresis loop for a short distance and which in the second stable state drive the first core from minus remanence up the hysteresis loop for a short distance and the second core from plus remanence to plus saturation and produces pulses of the other polarity which in the first stable state drive the first core from plus remanence down the hysteresis loop for a short distance and the second core from minus remanence to negative saturation and in the second stable state drive the first core from negative remanence to negative saturation and the second core from positive remanence down the hysteresis loop a short distance.

2. An electrical circuit as defined in claim 1 in which said control means comprises at least one input winding on each of the two cores.

3. An electrical circuit as defined in claim 1 in which the control means comprises first and second inputs, a set winding on each of the two cores and controlled by the first input, and a reset winding on each of the two cores controlled by the second input.

4. An electrical circuit as defined in claim 1 in which the control means comprises all of the following: a set input, set windings on said cores and connected to the set input and which in response to a set input pulse will place the first core in the region of plus remanence and the second core in the region of minus remanence, a reset input, reset windings on said cores and connected to the reset input and which in response to a reset input pulse will place the first core in the region of minus remanence and the second core in the region of plus remanence.

5. An electrical circuit as defined in claim 1 in which there is only one output in series with each winding.

6. An electrical circuit as defined in claim 1 including means for blocking flow of current in said windings due to potentials which are induced therein when the cores are flipped from one to another stable state.

7. An electrical circuit as defined in claim 1 in which the alternating current has periods of zero potential between positive and negative excursions thereof, and means for preventing flow of current in said branch circuits during said periods.

8. An electrical circuit as defined in claim 1 in which the alternating current has a substantial period of zero potential each time the wave crosses the zero axis, said first output including two output resistors connected together at one end of each with the common connection being in turn connected to one end of the first winding, a first rectifier having its cathode connected to the other end of the first resistor, a second rectifier having its anode connected to the other end of the second resistor, said second output including third and fourth resistors connected together at one end of each with the common connection being in turn connected to one end of said second winding, a third rectifier having its cathode connected to the other end of the third resistor, a fourth rectifier having its anode connected to the other end of the fourth resistor, a source of push-pull alternating current having a center tap connected to one side of said first-named source, means connecting one side of the push-pull source to the anodes of the first and third rectifiers, and means connecting the other side of the push-pull source to the cathodes of the second and fourth rectifiers, the push-pull source being so synchronized with the first-named alternating current source that the push-pull source applies positive potential to the cathodes of the second and fourth rectifiers and negative potential to the anodes of the first and third rectifiers during said periods when the first-named source has zero potential.

9. An electrical circuit with at least two stable states comprising first and second saturable cores, first and second power windings on said cores respectively, pulse generating means for producing a series of spaced pulses, output means, two branch circuits respectively including said power windings for feeding the pulses from said pulse generating means through the power windings to the output means with the current dividing between said branches in a proportion depending upon the impedances of the branch circuits, first and second control means each comprising a control winding on each of said cores, the control windings on each core being wound in opposing directions, and means connecting the control windings of each of the first and second control means in circuit with respective first and second sources of control pulses, the windings of each control means oppositely affecting the impedance of said first and second power windings to the flow of pulses in response to energization of the control windings by control pulses.

10. An electrical circuit comprising a plurality of saturable cores, windings respectively on said cores, a plurality of parallel branch circuits each of which includes one winding, pulse generating means for passing a series of spaced pulses through said branch circuits whereby the current will divide between the windings according to their impedances, a source of control pulses, and coils wound on each of said cores and coupled to said source of control pulses, said coils being so wound to oppositely affect the impedance of the windings on at least two of said cores to said spaced pulses in response to the flow of a control pulse through at least one control coil on each of said cores.

11. In a circuit with a plurality of stable states, a plurality of saturable cores, a plurality of windings respectively on the cores, means for producing spaced pulses and passing them through the windings so that the current divides through the windings according to the impedances of the windings, a source of control pulses, and coils wound on each of said cores and coupled to said source of control pulses, said coils being so wound as to oppositely affect the impedance of the windings on at least two of said cores to said spaced pulses in response to the flow of a control pulse through at least one control coil on each of said cores.

12. An electrical circuit comprising first and second saturable cores, first and second windings on said cores respectively, first and second outputs, first and second branch circuits, a source of spaced pulses, the first branch circuit including said source, the first winding and the first output, the second branch circuit including said source, the second winding and the second output, first and second control means each having a control coil on said first and second saturable cores, the coils of each of said control means being serially connected to a source of control pulses to cause said first and second windings to respectively present a high and low impedance to said spaced pulses in response to a control pulse from said source being fed to said first control means and to cause said first and second windings to respectively present a low and high impedance to said spaced pulses in response to a control pulse being fed to said second control means.

13. A circuit with plural states comprising first and second saturable cores; first and second windings on said cores respectively; first and second outputs; a source of alternating current which has a substantial period of zero potential each time it crosses the zero axis; a first branch circuit including said source, said first winding and said first output; a second branch circuit including said source, said second winding and said second output; a set input; a reset input; means which in response to a set input pulse at the set input during one of said periods of zero potential will drive the first core into a region near plus remanence and the second core to a region near minus remanence; means which in response to a pulse at the reset input will drive the second core to a region near plus remanence and the first core to a region near minus remanence; the parameters of the branch circuits being so related that following a set input pulse, the subsequent positive pulses of said source drive the first core from plus remanence to positive saturation and the second core from minus remanence up the hysteresis loop for a short distance while negative pulses of the source drive the first core from plus remanence down the hysteresis loop for a short distance and the second core from minus remanence to negative saturation and following a reset pulse the positive pulses drive the first core from minus remanence up the hysteresis loop for a short distance and the second core from plus remanence to plus saturation and the negative pulses drive the first core from negative remanence to negative saturation and the second core from positive remanence down the hysteresis loop a short distance.

14. A circuit with at least two stable states comprising first and second saturable cores having substantially square hysteresis loops; first and second windings on said cores respectively; first and second outputs; a source of alternating current having a substantial period of zero potential each time the wave crosses the zero axis; a first branch circuit including said source, said first winding and said output; a second branch circuit including said source, said second winding and said second output; set input windings on the two cores for placing the circuit in one stable state in response to a set input pulse occurring during one of said periods of zero potential; reset windings on the two cores which in response to a pulse therethrough during one of said periods of zero potential will place the circuit in its second stable state; said branch circuits controlling the current from said source through said windings so that in the first stable state the positive pulses of said source drive the first core from plus remanence to positive saturation and the second core from minus remanence up the hysteresis loop for a short distance while negative pulses of the source drive the first core from plus remanence down the hysteresis loop for a short distance and the second core from minus remanence to negative saturation and which in the second stable state of the apparatus the positive pulses drive the first core from minus remanence a short distance up the hysteresis loop and the second core from plus remanence to plus saturation and the negative pulses drive the first core from negative remanence to negative saturation and the second core from positive remanence down the hysteresis loop a short distance.

15. A circuit having two stable states comprising first and second saturable cores; first and second windings on said cores respectively; first and second outputs; a source of alternating current; a first branch circuit including said source, said first winding and said first output; a second branch circuit including said source, said second winding and said second output; control means for placing the device in a first stable state in which the first core operates in a region near plus remanence and the second core operates in a region near minus remanence and for also placing the device in a second stable state in which the first core operates in a region near minus remanence and the second core operates in a region near positive remanence; the parameters of said source and branch circuits being so related that in the first stable state the positive pulses of said source drive the first core from plus remanence to positive saturation and the second core from minus remanence up the hysteresis loop for a short distance while negative pulses of the source drive the first core from plus remanence down the hysteresis loop for a short distance and the second core from minus remanence to negative saturation and in the second stable state the positive pulses drive the first core from minus remanence a short distance up the hysteresis loop and the second core from plus remanence to plus saturation and the negative pulses drive the first core from negative remanence to negative saturation and the second core from positive remanence down the hysteresis loop a short distance.

16. A circuit having at least two stable states and comprising first and second saturable cores; first and second windings on said cores respectively; first and second outputs; a first branch circuit including said first winding and said first output; a second branch circuit including said second winding and said second output; said cores having substantially square hysteresis loops; set input means operable in the absence of current flowing through said windings for placing the first core in a region near positive remanence and the second core in a region near negative remanence; reset means operable during a period when no current is flowing through said windings for placing the second core in a region near positive remanence and the first core in a region near negative remanence; and means for passing an alternating current through said branch circuits which current has a substantial period of zero potential whenever it crosses its zero axis to thereby provide periods during which the set and reset means may operate to flip the cores to the desired stable states, the last-named means producing positive pulses which in the first stable state drive the first core from plus remanence to plus saturation and the second core from minus remanence up the hysteresis loop for a short distance and which in the second stable state drive the first core from minus remanence a short distance up the hysteresis loop and the second core from plus remanence to plus saturation and also producing negative pulses which in the first stable state drive the first core from plus remanence down the hysteresis loop for a short distance and the second core from minus remanence to negative saturation and in the second stable state drive the first core from negative remanence to negative saturation and the second core from positive remanence down the hysteresis loop a short distance.

17. An electrical circuit comprising a plurality of saturable cores, windings respectively on said cores, a plurality of branch circuits each including one of said windings, pulse generating means for passing a series of spaced pulses through said branch circuits whereby the current will divide between the windings according to their impedances, control means comprising two control circuits each for respectively magnetizing said first and second cores in opposite directions and each having a control coil on said first and second saturable cores serially connected to a source of control pulses for determining the portion of its hysteresis loop on which each core operates whereby to determine the impedances of the windings, and means whereby the circuit has gain so that a change in power in the control means will cause a larger change in power in at least one of the branch circuits.

18. A circuit as defined in claim 13 having means included in each branch circuit to enable the circuit to be characterized by power gain whereby a given current change in one of the inputs may cause a larger change in current in one of the outputs.

19. An electrical circuit comprising first and second saturable cores; first and second windings on said cores respectively; first and second outputs; an alternating current pulse generating means for producing a series of pulses at a steady repetition rate irrespective of the operation of the remaining parts of the circuit; a first branch circuit including said pulse generating means, the first winding and said first output; a second branch circuit including said pulse generator, said second winding and said second output; control means for placing the electrical circuit in a first stable state in which the first core operates in a region near positive remanence and the second core operates in a region near negative remanence and alternatively for placing the circuit in the second stable state in which the first core operates in a region near negative remanence and the second core operates in a region near positive remanence; said pulse generating means producing pulses of a magnitude so related to the number of turns on said first winding that pulses of one polarity in the first stable state drive the first core from plus remanence to plus saturation and in the second stable state drive the first core from minus remanence up the hysteresis loop for a short distance and pulses of the other polarity in the first stable state drive the first core from plus remanence down the hysteresis loop for a short distance and in the second stable state drive the first core from negative remanence to negative saturation; and the magnitude of the pulses being so related to the number of turns on said second winding that pulses of said one polarity in the first stable state drive the second core from minus remanence up the hysteresis loop for a short distance and which in the second stable state drive the second core from plus remanence to plus saturation and pulses of said other polarity in the first stable state drive the second core from minus remanence to negative saturation and in the second stable state drive the second core from positive remanence down the hysteresis loop for a short distance.

20. An electrical circuit with at least two stable states comprising first and second saturable cores, alternating current pulse generating means for producing pulses of steady repetition rate irrespective of the operation of the remaining parts of the system, first and second coils on said cores respectively, output means, two parallel branch circuits each of which includes said pulse generating means and arranged to feed the alternating pulses from said pulse generating means through the windings to the output means with the current dividing between said branches, and control means for determining the part of the hysteresis loop on which said cores operate to thereby determine the impedances of said windings.

21. An electrical circuit with at least two stable states comprising first and second saturable cores, alternating current pulse generating means for producing pulses of steady repetition rate, first and second coils on said cores respectively, output means, two parallel branch circuits each of which includes said pulse generating means and arranged to feed the pulses from said pulse generating means through the windings to the output means with the current dividing between said branches, and control means for determining the part of the hysteresis loop on which said cores operate to thereby determine the impedances of said windings, said control means including a first circuit including a winding on each core which when energized sets said cores so that the first one is in a positive saturation region and the second one is in a negative saturation region; said control means also including another circuit having a winding on each core which when energized sets the cores so that the first core is in a negative saturation region and the second core is in a positive saturation region.

22. An electrical circuit comprising first and second saturable cores; first and second windings on said cores respectively; first and second outputs; a first branch circuit including said first winding and said first output; a second branch circuit including said second winding and said second output; control means for placing the electrical circuit in a first stable state in which said first core operates in a region near a first remanent state and said second core operates in a region near a second remanent state and alternatively for placing the circuit in a second stable state in which said first core operates in a region near a second remanent state and said second core operates in a region near a first remanent state; and means including a source of alternating current for energizing said branch circuits and producing pulses of one polarity which in said first stable state tends to drive said first core from its first remanent state to saturation in a corresponding polarity and said second core from its second remanent state along the hysteresis loop for a short distance in a direction to reduce the flux density and which in said second stable state tends to drive said first core from its second remanent state along the hysteresis loop for a short distance in a direction to reduce the flux density and said second core from its first remanent state to saturation in a corresponding polarity, and said source of alternating current also producing pulses of the other polarity which in said first stable state drive said first core from its first remanent state along the hysteresis loop for a short distance in a flux density reducing direction and said second core from the second remanent state to saturation in a corresponding polarity and in said second stable state drive said first core from its second remanent state to saturation in a corresponding polarity and said second core from its first remanent state along the hysteresis loop a short distance in a flux density reducing direction.

23. A circuit with plural states comprising first and second saturable cores; first and second windings on said cores respectively; first and second outputs; a source of alternating current which has a substantial period of zero potential each time it crosses the zero axis; a first branch circuit including said source, said first winding and said first output; a second branch circuit including said source, said second winding and said second output; a set input; a reset input; means which in response to a set input pulse at the set input during one of said periods of zero potential drives said first core into a region near a first remanent state and said second core to a region near a second remanent state; means which in response to a pulse at said reset input drives the second core to a region near its first remanent state and said first core to a region near its second remanent state; the parameters of the branch circuits being so related that, following a set input pulse the subsequent positive pulses of said source drive said first core from its first remanent state to saturation in a corresponding polarity and said second core from its second remanent state along the hysteresis loop for a short distance in a flux density reducing direction while negative pulses of said source drive said first core from its first remanent state along the hysteresis loop for a short distance in a pulse density reducing direction and said second core from the second remanent state to saturation in a corresponding polarity, and following a reset pulse the positive pulses of said source drive said first core from its second remanent state along the hysteresis loop for a short distance in a flux density reducing direction and said second core from its first remanent state to saturation in a corresponding polarity and the negative pulses of said source drive said first core from its second remanent state to saturation in a corresponding polarity and said second core from its first remanent state along the hysteresis loop a short distance in a flux density reducing direction.

24. An electrical circuit comprising first and second saturable cores; first and second windings linked to said cores respectively in certain senses; first and second outputs; a first branch circuit including said first winding and said first output; a second branch circuit including said second winding and said second output; means for energizing said branch circuits in parallel; and control means including a first control circuit for supplying control signals to said saturable cores and linked to said first core in the same sense as said first winding and to said second core in the opposite sense from said second winding, and a second control circuit for supplying control signals to said saturable cores and linked to said first and second cores respectively in opposite senses from said first control circuit.

25. A bistable circuit comprising a first and a second magnetic element each having two remanent states and each inductively coupled to a different branch of a group of parallel load circuits, and control means having a first control circuit inductively coupled to said first and second elements to set the elements each in certain remanent magnetic conditions whereby the sense of inductive coupling between the first control circuit and the first saturable element in opposite to the coupling of the corresponding branch of said load circuits with the first saturable element and the sense of inductive coupling between said first control circuit and the second saturable element is in the same sense to the coupling between the corresponding branch circuit and said second saturable element, and a second circuit inductively coupled to the first and second elements in a sense opposite to the respective coupling of said first control circuit.

26. A circuit with plural states comprising first and second saturable magnetic cores, a first control circuit for setting said cores in a first remanent magnetic state and a second control circuit for setting said cores in a second remanent magnetic state, a first and a second output, a first and a second winding respectively linked to said first and second cores, means connecting said first and second outputs through said first and second windings respectively to a source of alternating current signals, said windings being coupled to said cores in a sense to cause said alternating current signals to drive the first core to saturation and the second core along the hysteresis loop in a direction to reduce the flux density when the alternating current signals are of one polarity and to drive said second core to saturation and the first core along the hysteresis loop in a direction to reduce the flux density when the alternating current signals are of the opposite polarity with the cores in a first remanent magnetic state and to cause said cores to be driven in an opposite fashion in response to the respective polarities of the alternating current signals when the cores are in the second remanent magnetic state.

27. A circuit as defined in claim 26 in which the magnitudes of the alternating current signals are sufficient to cause a change in flux density in the core being driven along the hysteresis loop in a direction to reduce the flux density but not sufficient to cause the core to go to the opposite remanent state.

28. An electrical circuit with at least two stable states comprising first and second saturable cores, alternating current pulse generating means for producing pulses of steady repetition rate, first and second coils linked to said cores respectively, a first and second output means respectively in circuit with said first and second coils, two parallel branch circuits each of which includes the corresponding first and second coils and first and second output means in circuit with said pulse generating means and arranged to feed the pulses from said pulse generating means through the windings to the output means with the current dividing between said branches to produce a positive output at the first output means and a negative output at the second output means during the half cycles of the alternating current pulse of corresponding polarity when the cores are set in one direction and to produce a negative output at the first output means and a positive output at the second output means respectively during the half cycles of the alternating current of corresponding polarity when the cores are set in the opposite direction.

References Cited in the file of this patent

UNITED STATES PATENTS

| | | |
|---|---|---|
| 2,591,406 | Carter et al. | Apr. 1, 1952 |
| 2,774,956 | Bonn | Dec. 18, 1956 |
| 2,782,325 | Nilssen | Feb. 19, 1957 |

OTHER REFERENCES

Publication entitled, The Single-Core Magnetic Amplifier As a Computer Element, by R. A. Ramey, January 1953, AIEE Transactions-Communications and Electronics, Part I, pp. 442–446. (Copy in Div. 42 340–174.6 (16A).)